United States Patent [19]

Weiss et al.

[11] Patent Number: 4,618,371
[45] Date of Patent: Oct. 21, 1986

[54] COATING MATERIALS WHICH CONTAIN α-HYDROXYKETONES AS ANTISKIMMING AGENTS

[75] Inventors: Wolfram Weiss, Mutterstadt; Wolf-Dieter Balzer; Rolf Fikentscher, both of Ludwigshafen; Guenther Immel, Weinheim; Hans Wolf, Ludwigshafen, all of Fed. Rep. of Germany

[73] Assignee: BASF Aktiengesellschaft, Ludwigshafen, Fed. Rep. of Germany

[21] Appl. No.: 734,186

[22] Filed: May 15, 1985

[30] Foreign Application Priority Data

May 22, 1984 [DE] Fed. Rep. of Germany ....... 3418988

[51] Int. Cl.$^4$ .............................................. C08L 91/00
[52] U.S. Cl. .................................................. 106/263
[58] Field of Search ........................ 106/252; 568/414; 106/252-263

[56] References Cited

U.S. PATENT DOCUMENTS 2,377,029  5/1945  Norrd ................................. 106/263
4,182,690  1/1980  Fan ..................................... 524/114

FOREIGN PATENT DOCUMENTS 1369025 10/1974 United Kingdom .

Primary Examiner—Theodore Morris
Attorney, Agent, or Firm—Keil & Weinkauf

[57] ABSTRACT

Coating materials containing aliphatic α-hydroxyketones of the general formula

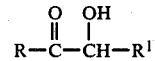

where R and $R^1$ are each hydrogen or a hydrocarbon radical of 1 to 4 carbon atoms, as antiskimming agents. These α-hydroxyketones are particularly useful in paints and finishes based on oxidatively drying alkyd resins.

6 Claims, No Drawings

COATING MATERIALS WHICH CONTAIN α-HYDROXYKETONES AS ANTISKIMMING AGENTS

The present invention relates to air-drying coating materials, paints and finishes, in particular paints and finishes based on oxidatively drying alkyd resins, which contain aliphatic α-hydroxyketones as antiskimming agents.

Air-drying and oxidatively drying finishes contain film formers which are converted to the solid state in the presence of atmospheric oxygen. Such finishes are described in, for example, H. Kittel, "Lehrbuch der Lacke und Beschichtungen", Vol. III (1976), page 261 et seq.; in the Glasurit manual "Lacke und Farben", 10th edition, 1969; by W. O. Lundberg in "Antioxidation and antioxidants", Vol. II, Interscience Publishers, New York, London 1962; and by W. Kurze in Ullmanns Enzyklopädie der technischen Chemie, 4th edition, Vol. 8, 1974.

These film formers include the drying oils and in particular alkyd resins which are derived from natural and synthetic fatty acids, eg. from linseed oil, soybean oil and castor oil.

To accelerate the oxidative drying, siccatives are added to the coating systems, these siccatives generally being metal soaps, eg. octoates or naphthenates of cobalt, manganese, lead, etc.

Oxidative drying not only takes place in the surface coating film but can even occur in the liquid surface coating during its storage. In this case, conversion to the solid state takes place to a greater extent where the oxygen is able to act, ie. at the surface. The thicker or thinner skin forms, which can have an adverse effect on the use of the surface coating and is therefore undesirable.

To reduce skin formation, antioxidants, referred to as antiskimming agents in the relevant literature above, are added to the oxidatively drying coating materials. Effective substances in this context are
(a) antioxidants based on phenols and aromatic amines (cf. the abovementioned article by W. Kurze in Ullmann Enzyklopädie der technischen Chemie) and
(b) oximes (cf. the abovementioned textbook by H. Kittel and the publication by M. Giesen, FATIPEC Kongressbuch 1964, pages 349–353) and hydroxylamines (cf. German Laid-Open Application DOS No. 1,519,103).

The compounds stated under (a) are sparingly volatile and prolong the drying time for the surface coatings. Among the volatile antiskimming agents stated under (b), methyl ethyl ketoxime and butyraldoxime have proven particularly effective. In practice, these products are generally used as a mixture with other antioxidants.

The above classes of compounds are products which no longer meet present-day requirements in respect of non-polluting surface coating systems. For example, butyraldoxime is classed as toxic. Moreover, these compounds are one of the causes for discoloration of the surface coating.

We have found that skin formation during storage of solutions which contain oxidatively drying film formers, in particular alkyd resins, can be prevented if α-hydroxyketones are used as antiskimming agents.

The present invention relates to coating materials, paints and finishes which contain oxidatively drying film formers and, as antiskimming agents, aliphatic α-hydroxyketones of the general formula

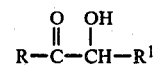

where R and $R^1$ are each hydrogen or a hydrocarbon radical of 1 to 4 carbon atoms, in particular paints and finishes which contain alkyd resins.

The α-hydroxyketones are generally used in amounts of 0.01 to 2, preferably from 0.05 to 1, % by weight, based on the total surface coating, and can also be employed in combination with other antiskimming agents or antioxidants.

Like the low molecular weight oximes, the aliphatic α-hydroxyketones evaporate relatively rapidly from the surface coating film owing to their high vapor pressure, so that the drying process is not retarded. Compared with the oximes, however, they have the advantages of not contributing toward discoloration of the surface coating and of being classed as toxicologically acceptable.

α-Hydroxyketones are known from the literature. In the above formula, R and $R^1$ are each hydrogen or a hydrocarbon radical, in particular a saturated hydrocarbon radical, of 1 to 4 carbon atoms, eg. $-CH_3$, $-C_2H_5$, $-C_3H_7$ or $-C_4H_9$. The preparation of α-hydroxyketones, which does not form a subject of the present patent application, can be carried out by, for example, partial oxidation of 1,2-diols. For use as antiskimming agents, the products can also be employed as a mixture with their starting compounds, without prior purification by distillation.

As in the ketoxime series, the antiskimming action decreases with increasing molecular weight. The first member of the series, hydroxyacetone (where R is $CH_3$ and $R^1$ is H) is the most effective compound.

The amounts which have to be added in order to achieve good antiskimming effects are small and, depending on the tendency of the particular surface coating to a skin formation and the constitution of the agent employed, are from 0.01 to 2, preferably from 0.05 to 1, % by weight, based on the total surface coating. The combination with other antiskimming agents and/or antioxidants is possible.

The α-hydroxyketones are incorporated into the coating materials by a conventional method, for example by stirring in the liquid α-hydroxyketone or a solution of this in a solvent conventionally used for surface coatings.

In the Examples which follow, parts and percentages are by weight.

EXAMPLES 1 to 4

A commercial clear finish consisting of
100 parts of a commercial synthetic fatty acid alkyd resin for air-drying industrial coatings (eg. ®Alkydal F 46, 55% strength),
3.3 parts of cobalt lead manganese octoate (containing 11% of Pb, 0.75% of Co and 0.75% of Mn), 50% strength in xylene,
is mixed with
0.08 parts of hydroxyacetone (crude product, 67% strength in propylene glycol) in Example 1,
0.08 part of distilled hydroxyacetone in Example 2,
0.2 part of a mixture of 30 parts of hydroxyacetone, 20 parts of triphenylphosphine, 25 parts of n-butanol and 25 parts of xylene (referred to as mixture A below) in Example 3 and
0.08 part of hydroxybutanone in Example 4.

For comparison, commercial antiskimming agents are added to the above finish.
0.08 part of butyraldoxime is added in Comparison 1,
0.08 part methyl ethyl ketoxime in Comparison 2,
0.08 part of ®Kerobit TBK (substituted phenol) in Comparison 3 and
0.08 part of ®Kerobit BHT (substituted phenol) in Comparison 4.

100 g of the samples prepared in this manner are introduced into a 250 ml glass vessel with a screw cap. The vessels containing this charge are closed, stored at 23° C. and examined at specified time intervals for skin formation. The results are shown in Table 1 below.

TABLE 1

(Skin formation)

| Test finish | Skin formation after ... days* | | | | | |
|---|---|---|---|---|---|---|
| | 3 | 7 | 14 | 21 | 28 | 35 |
| Example 1 | 0 | 0 | 0 | 1 | 3 | 4 |
| Example 2 | 0 | 0 | 0 | 1 | 2 | 3 |
| Example 3 | 0 | 0 | 0 | 1 | 3 | 4 |
| Example 4 | 0 | 0 | 1 | 2 | 3 | 4 |
| Comparison 1 | 0 | 0 | 0 | 2 | 3 | 4 |
| Comparison 2 | 0 | 0 | 0 | 2 | 3 | 4 |
| Comparison 3 | 0 | 0 | 0 | 1 | 3 | 4 |
| Comparison 4 | 0 | 0 | 0 | 1 | 2 | 3 |
| without anti-skimming agent | 1 | 2 | 2 | 3 | 4 | 4 |

*0 = no skin formation
1 = beginning of skin formation at the glass wall
2 = thin skin
3 = thick skin
4 = finish gelled The test results from Table 1 show that the α-hydroxyketones used, in the form of the crude product, as the pure product and as a mixture with a different type of antioxidant, such as triphenylphosphine, achieve the antiskimming effect obtained with prior art products. Only the homolog which is higher than hydroxyacetone, ie. hydroxybutanone, which has a higher molecular weight, is somewhat inferior.

Table 2 below shows the drying behavior of corresponding finishes. Each of the finishes is applied onto glass sheets after storage for 7 and 21 days, and the times taken for surface drying and for thorough drying of the finish are determined in each case.

Comparisons 3 and 4 clearly illustrate the retarding effect of phenol-based antiskimming agents on the drying process. The novel products in Examples 1 to 4 behave similarly to the volatile oximes from Comparisons 1 and 2, retardation of the drying process being somewhat less.

TABLE 3

(Discoloration)

| Test finish | Iodine color number of the 4-week old finish |
|---|---|
| Example 1 | 20 |
| Example 2 | 20 |
| Example 3 | 20 |
| Example 4 | 20 |
| Comparison 1 | 50 |
| Comparison 2 | 50 |
| Comparison 3 | 35 |
| Comparison 4 | 40 |
| without antiskimming agent | 20 |

Table 3 shows that the addition of the novel antiskimming agents does not contribute to discoloration of the finishes compared with Comparisons 1 to 4.

EXAMPLES 5 to 7

Clear finishes produced similarly to Examples 1 to 4 are mixed with
0.25 part of hydroxyacetone in Example 5,
0.04 part of hydroxyacetone in Example 6,
0.25 part of hydroxybutanone in Example 7,
0.25 part of methyl ethyl ketoxime in Comparison 5 and
0.04 part of methyl ethyl ketoxime in Comparison 6, and assessment is carried out similarly to Examples 1 to 4.

TABLE 4

(Skin formation)

| Test finish | Skin formation after ... days (cf. Table 1) | | | | | |
|---|---|---|---|---|---|---|
| | 3 | 7 | 14 | 21 | 28 | 35 |
| Example 5 | 0 | 0 | 0 | 1 | 2 | 2 |
| Example 6 | 0 | 0 | 1 | 2 | 3 | 4 |
| Example 7 | 0 | 0 | 0 | 1 | 2 | 2 |
| Comparison 5 | 0 | 0 | 0 | 0 | 0 | 2 |
| Comparison 6 | 0 | 0 | 2 | 3 | 4 | 4 |
| without anti-skimming agent | 1 | 2 | 2 | 3 | 4 | 4 |

TABLE 2

(Film test)

| Finish | Surface dry | | thoroughly dry | |
|---|---|---|---|---|
| | After storage for 7 days | After storage for 21 days | After storage for 7 days | After storage for 21 days |
| Example 1 | after 19 hours | after 17 hours | after 21 hours | after 19 hours |
| Example 2 | after 18 hours | after 15 hours | after 20 hours | after 17 hours |
| Example 3 | after 22 hours | after 19 hours | after 24 hours | after 20 hours |
| Example 4 | after 21 hours | after 18 hours | after 23 hours | after 20 hours |
| Comparison 1 | after 22 hours | after 20 hours | after 24 hours | after 20 hours |
| Comparison 2 | after 22 hours | after 19 hours | after 23 hours | after 21 hours |
| Comparison 3 | >24 hours | after 23 hours | >24 hours | >24 hours |
| Comparison 4 | >24 hours | >24 hours | >24 hours | >24 hours |
| without antiskimming agent | after 18 hours | after 15 hours | after 20 hours | after 17 hours |

TABLE 5

(Film test)

| Finish | surface dry | | thoroughly dry | |
|---|---|---|---|---|
| | After storage for 7 days | After storage for 21 days | After storage for 7 days | After storage for 21 days |
| Example 5 | after 19 hours | after 17 hours | 22 hours | after 20 hours |
| Example 6 | after 17 hours | after 14 hours | after 19 hours | after 17 hours |
| Example 7 | after 20 hours | after 18 hours | 24 hours | after 21 hours |
| Comparison 5 | after 19 hours | after 18 hours | >24 hours | after 21 hours |
| Comparison 6 | after 17 hours | after 15 hours | after 20 hours | after 17 hours |
| without anti-skimming agent | after 18 hours | after 15 hours | after 20 hours | after 17 hours |

TABLE 6

(Discoloration)

| Test finish | Iodine number of the 4-week old finish |
|---|---|
| Example 5 | 20 |
| Example 6 | 20 |
| Example 7 | 20 |
| Comparison 5 | 60 |
| Comparison 6 | 30 |
| without antiskimming agent | 20 |

Tables 4, 5 and 6 show the effect of various amounts of additives according to the invention in comparison with the prior art.

EXAMPLES 8 to 10

Finishes based on a commercial synthetic fatty acid alkyd resin for air-drying industrial coatings (eg. Alkydal F 46, 55% strength) are produced by a method similar to that described in Examples 1 to 4, and the amount of siccative is doubled by using 3.3 parts of cobalt lead manganese octoate (11% of Pb, 0.75% of Co and 0.75% of Mn) undiluted. These finishes are mixed with
0.1% of hydroxyacetone in Example 8,
0.2% of hydroxyacetone in Example 9 and
0.4% of hydroxyacetone in Example 10,
and testing for skin formation is carried out as described in Examples 1 to 4.

TABLE 7

(Skin formation)

| Test finish | Skin formation after . . . days (cf. Table 1) | | | | | |
|---|---|---|---|---|---|---|
| | 3 | 7 | 14 | 21 | 28 | 35 |
| Example 8 | 1 | 2 | 3 | 4 | 4 | 4 |
| Example 9 | 0 | 1 | 2 | 3 | 4 | 4 |
| Example 10 | 0 | 0 | 0 | 1 | 1 | 1 |
| not added | 2 | 3 | 4 | 4 | 4 | 4 |

Examples 8 to 10 show that the antiskimming action of the α-hydroxyketones is retained even when a large amount of a siccative is used.

The Examples below illustrate the effect of the antiskimming agents in clear finishes based on different oxidatively drying alkyd resins. The mixture A described in Example 3 and consisting of
30 parts of hydroxyacetone,
20 parts of triphenylphosphine,
25 parts of xylene and
25 parts of n-butanol
is used as the additive according to the invention.

EXAMPLES 11 and 12

100 parts of a commercial middle oil alkyd resin based on linseed oil (eg. Alkydal L 49, 55% strength) and
0.5 part of cobalt lead manganese octoate (11% of Pb, 0.75% of Co and 0.75% of Mn), undiluted, are mixed with
0.2 part of mixture A in Example 11,
0.5 part of mixture A in Example 12,
0.2 part of methyl ethyl ketoxime in Comparison 7 and
0.5 part of methyl ethyl ketoxime in Comparison 8,
and assessment is carried out similarly to the above Examples (cf. Tables 8 and 9).

EXAMPLES 13 and 14

100 parts of a short oil alkyd resin based on dehydrated castor oil (eg. ®Alftalat AR 300, 55% strength) and 2 parts of cobalt lead manganese octoate (11% of Pb, 0.75% of Co and 0.75% of Mn), undiluted, are mixed with
0.2 part of mixture A in Example 13,
0.5 part of mixture A in Example 14,
0.2 part of methyl ethyl ketoxime in Comparison 9 and
0.5 part of methyl ethyl ketoxime in Comparison 10,
and testing is carried out as described above (cf. Tables 8 and 9).

TABLE 8

(Skin formation)

| Test finish | Skin formation after . . . days (cf. Table 1) | | | | | | |
|---|---|---|---|---|---|---|---|
| | 1 | 3 | 7 | 14 | 21 | 28 | 35 |
| Example 11 | 0 | 0 | 0 | 1 | 2 | 3 | 3 |
| Example 12 | 0 | 0 | 0 | 0 | 0 | 2 | 2 |
| Comparison 7 | 0 | 0 | 0 | 2 | 3 | 3 | 3 |
| Comparison 8 | 0 | 0 | 0 | 0 | 0 | 2 | 2 |
| without antiskimming agent | 1 | 2 | 3 | 3 | 3 | 3 | 4 |
| Example 13 | 0 | 0 | 0 | 0 | 0 | 3 | 4 |
| Example 14 | 0 | 0 | 0 | 0 | 0 | 1 | 3 |
| Comparison 9 | 0 | 0 | 0 | 0 | 0 | 3 | 4 |
| Comparison 10 | 0 | 0 | 0 | 0 | 0 | 1 | 3 |
| without antiskimming agent | 0 | 2 | 3 | 4 | 4 | 4 | 4 |

TABLE 9

(Discoloration)

| Test finish | Iodine number of the 4-week old finish |
|---|---|
| Example 11 | 7 |
| Example 12 | 7 |
| Comparison 7 | 60 |
| Comparison 8 | 100 |
| without antiskimming agent | 7 |
| Example 12 | 4 |
| Example 14 | 4 |
| Comparison 9 | 30 |
| Comparison 10 | 50 |

TABLE 9-continued

| Test finish | (Discoloration) Iodine number of the 4-week old finish |
|---|---|
| without antiskimming agent | 4 |

We claim:

1. A coating material, paint or finish which contains an oxidatively drying film former and, as an anti-skimming agent, an aliphatic α-hydroxyketone of the formula $$R-\overset{O}{\underset{\|}{C}}-\overset{OH}{\underset{|}{CH}}-R^1$$

where R and $R^1$ are each hydrogen or a hydrocarbon radical of 1 to 4 carbon atoms.

2. A coating material, paint or finish as defined in claim 1, which contains the α-hydroxyketone in an amount of from 0.01 to 2% by weight, based on the total surface coating.

3. A coating material, paint or finish as defined in claim 1, which contains an alkyd resin as the oxidatively drying film former.

4. A coating material, paint or finish as defined in claim 2, which contains an alkyd resin as the oxidatively drying film former.

5. A coating material, paint or finish as defined in claim 1, which contains the aliphatic α-hydroxyketone together with other antiskimming agents and antioxidants.

6. A process for the production of a coating material, paint or finish as defined in claim 1, wherein an aliphatic α-hydroxyketone of the formula $$R-\overset{O}{\underset{\|}{C}}-\overset{OH}{\underset{|}{CH}}-R^1$$

where R and $R^1$ are each hydrogen or a hydrocarbon radical of 1 to 4 carbon atoms, in the liquid state or in solution in a conventional solvent for surface coatings, is incorporated into the coating material, paint or finish.

* * * * *